B. LJUNGSTRÖM.
ELECTRIC GENERATOR, MOTOR, AND SUCH LIKE.
APPLICATION FILED APR. 1, 1908.
999,811.
Patented Aug. 8, 1911.
4 SHEETS—SHEET 1.
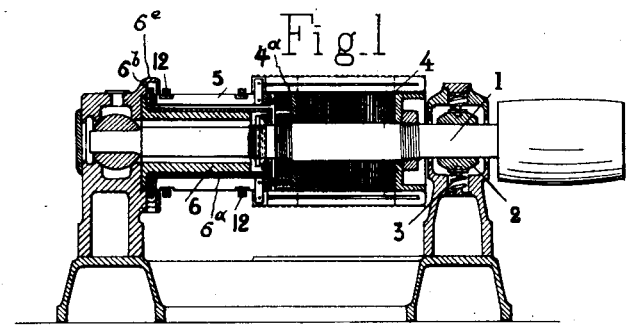
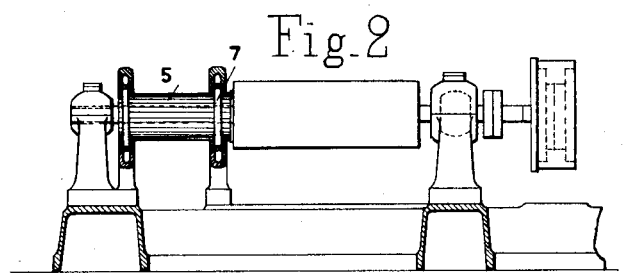
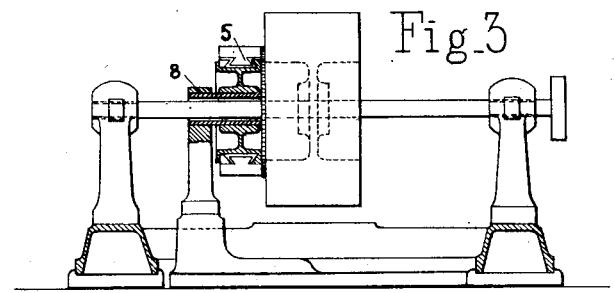
Witnesses.
Jesse N. Sutton.
Inventor.
Birger Ljungström

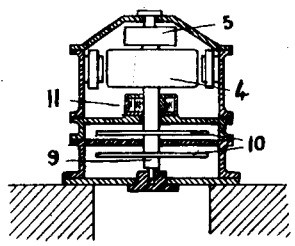
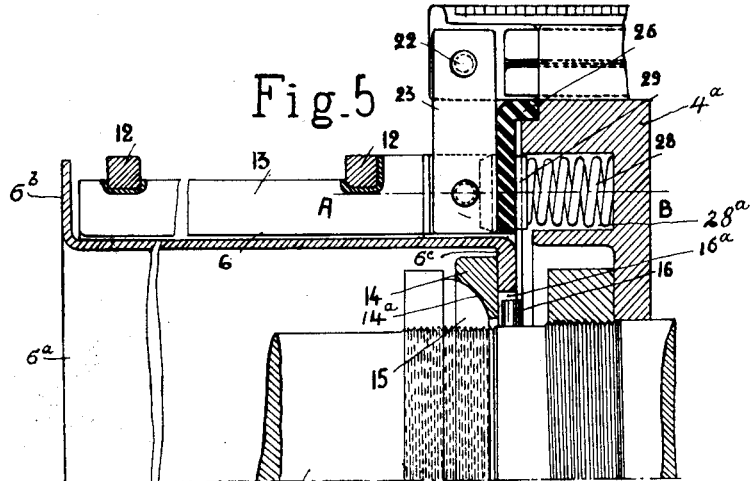
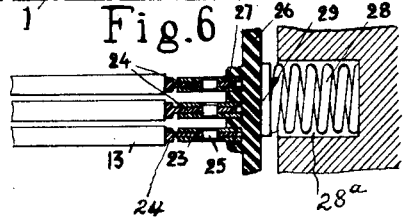

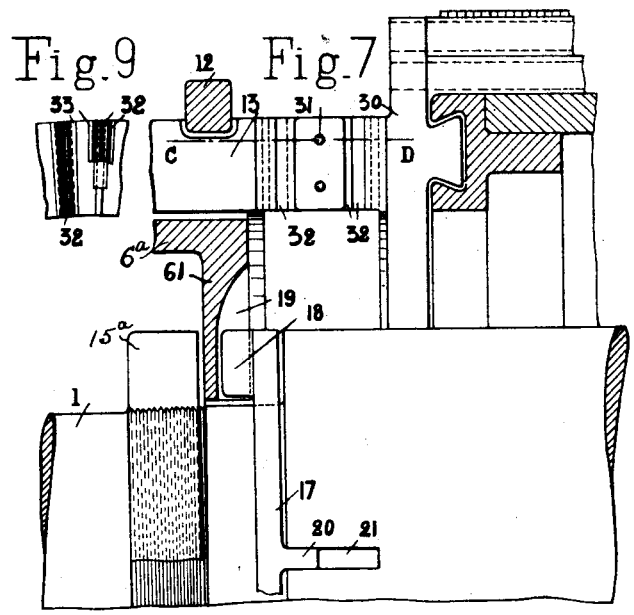
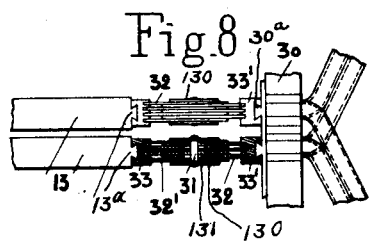
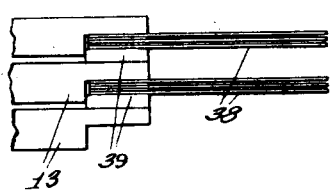
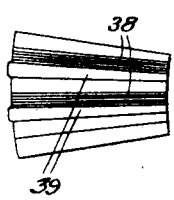

B. LJUNGSTRÖM.
ELECTRIC GENERATOR, MOTOR, AND SUCH LIKE.
APPLICATION FILED APR. 1, 1908.
999,811.
Patented Aug. 8, 1911.
4 SHEETS—SHEET 4.
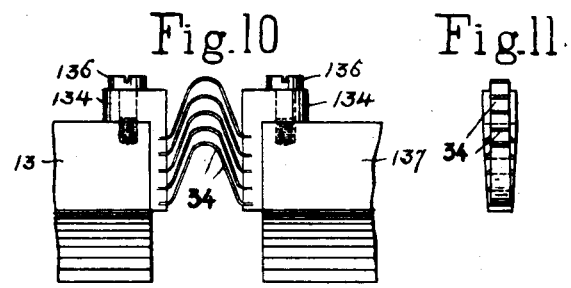
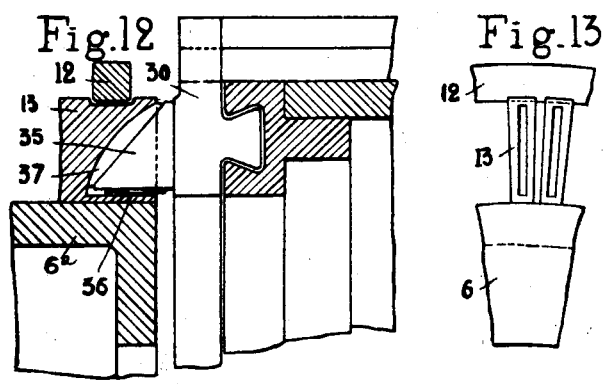
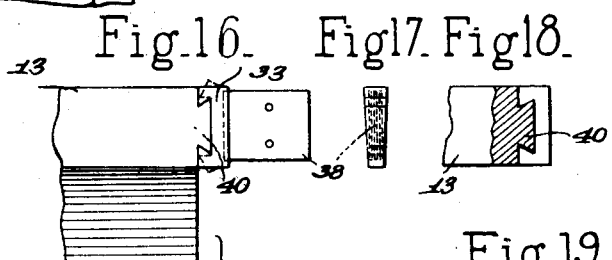
Witnesses.
Jesse N. Lutton.
B. V. Sommers
Inventor.
Birger Ljungström
by Henry Orth
Atty

UNITED STATES PATENT OFFICE.

BIRGER LJUNGSTRÖM, OF STOCKHOLM, SWEDEN.

ELECTRIC GENERATOR, MOTOR, AND SUCH LIKE.

999,811. Specification of Letters Patent. Patented Aug. 8, 1911.

Application filed April 1, 1908. Serial No. 424,677.

*To all whom it may concern:*

Be it known that I, BIRGER LJUNGSTRÖM, residing at Stockholm, Sweden, a subject of the King of Sweden, have invented certain new and useful Improvements in Electric Generators, Motors, and Such Like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to improvements in dynamo electric machines, especially direct current machines, and has for its object to mount the commutator or current collector independently of the rotor and connect it by a yielding electrical connection with the rotor, so that the rotor when not running true will not communicate its eccentric movement or vibration to the commutator.

The speed with which a direct current generator may be driven economically is chiefly limited by the vibrations of the rotor in its bearings, which at certain speeds is so great that there is but a poor sliding contact between the commutator and its brushes, causing heavy sparking at the brushes. This sparking causes not only loss of electrical energy but also great wear of both commutator and brushes.

Yielding bearings for the rotor, or the spring of the rotor shaft, produce this unsymmetrical movement of the rotor at high speeds.

By the use of the present invention it is possible to mount the rotor in yielding bearings and run it at any desired speed without affecting the commutator or current collector, as the latter is not fastened on the shaft of the rotor but has a separate bearing of its own, so as to be influenced as little as possible by the vibration or eccentric movement of the rotor, although the amplitude of vibration or eccentricity of the rotor movement be great. To this end the commutator is yieldingly connected to the rotor.

Referring to the drawings, in which like parts are similarly designated—Figure 1 is a vertical longitudinal section, showing a rotor mounted in yielding bearings with a commutator having a separate non-yielding bearing. Fig. 2 is an elevation showing a modification. Fig. 3 is a further modification showing the commutator supported independent of the motor frame. Fig. 4 is a vertical central section of a turbine driven generator embodying my invention. Fig. 5 is a section on a larger scale showing the yielding connection between the rotor and commutator. Fig. 6 is a horizontal section on the line A—B, Fig. 5. Fig. 7 is a section showing another form of yielding connection between commutator and rotor. Fig. 8 is a horizontal section on line C—D of Fig. 7. Fig. 9 is a detail, partly in section and partly in elevation of the sliding, tapered, dove-tail connections of Figs. 7 and 8. Fig. 10 is a side elevation, and Fig. 11 a vertical section through another form of yielding connection. Fig. 12 is a section, and Fig. 13 is an end elevation of a portion of a commutator showing a further modification. Figs. 14 to 19 show different forms of connection between the commutator bars and the plates or thin metal sheets electrically connecting them to the rotor windings.

Referring in detail to Fig. 1, the rotor shaft 1 is mounted at each end in bearings in the form of balls 2, the one at the right hand side of the machine being yieldingly held by springs 3 mounted in the frame of the machine. The commutator 5 is mounted on a hollow or tubular bearing 6 secured at one end to the frame of the machine, and is electrically connected to the rotor 4. The construction is more clearly shown in detail in Figs. 5 and 6.

The commutator is composed of bars or segments 13 mounted on a sleeve $6^a$ having an outwardly turned flange $6^b$ and an inwardly turned flange $6^c$ provided with slots $16^a$. The flange $6^b$ runs between a collar $6^e$, Fig. 1, and the bearing or frame and prevents the longitudinal displacement of the sleeve $6^a$ on its stub shaft bearing 6.

The commutator bars 13 are insulated from one another and from the sleeve $6^a$ in the customary manner being held to the sleeve $6^a$ by rings 12 likewise insulated from the bars. The flange $6^c$ of the sleeve is provided with slots $16^a$ into which take one or more pins 16 secured in and projecting from the rotor shaft 1.

A ring 14 bears with its flat side against the flange $6^c$ and is engaged on its concave spherical face $14^a$ by a collar 15 having a convex spherical face to fit the same, said collar being screwed or otherwise secured on the rotor shaft.

The pins 16 serve to rotate the sleeve 6ª and the commutator bars held therein in unison with the rotor shaft, but by reason of the slidable pin and slot connection 16, 16ª, the vibrations or eccentric movements of the shaft cannot be communicated to the sleeve and commutator bars.

Against each commutator bar 13 abuts a plate 24, and at substantially right angles thereto are placed plates 23, one on each side of plate 24 and held thereto by a rivet 25, the rivet making a pivotal joint to permit a slight movement of the parts. The plates 23 are in like manner pivotally connected by rivets 22 to the coil extensions or coil terminals of the rotor.

One of the end plates 4ª of the rotor, that is adjacent the commutator is provided with recesses 28ª in which are seated coil springs 28 whose outer ends take against blocks 29 on an insulating plate 26, provided with ribs 27 between which the ends of plates 23 and 24 enter. The ribs 27 act as spacing insulators for the sets of assembled plates 23, 24, and the springs 28 urge and maintain the plates 24 in contact with the ends of the commutator bars 13.

In Figs. 7, 8 and 9, I have shown a modification in which the inner flange 61 of sleeve 6ª is provided with slots 19, here shown as not passing entirely through the flange. The ring 15ª is screwed on the rotor shaft 1 loosely against flange 61. A ring 17 surrounds the rotor shaft and has lugs 20 on one face that enter slots 21 in the enlarged portion of the shaft, thereby causing the ring to rotate with the shaft. On the opposite face of the ring 17 are projections 18 that enter the slots 19.

The rotor coils end in substantially radial bars 30, provided with dove-tails 30ª on which fit pieces 33' having dove-tail grooves. Both 30ª and 33' taper radially, Fig. 9, and the centrifugal force of rotation tends to hold them tight should they become loose. Each piece 33' is provided with a number of plates 32 assembled alternately with similar plates 32' connected to pieces 33 having dove-tail grooves fitting dove-tails 13ª on the commutator bars. A plate 130 is placed at each side of the alternately assembled plates 32, 32' and rivets 31 connect these plates, passing through perforations or slots 131 in the plates 32, 32', said perforations being somewhat larger than the diameter of the rivets 31, thereby permitting relative movement of the plates 32 and 32'.

In Figs. 10 and 11, which are a side elevation and a section, respectively, I have shown a yielding electrical connection between a commutator bar 13 and a rotor coil terminal 137, consisting of inverted U-shaped metallic strips, each end of which strips being connected to a piece 134 held to the parts to be electrically connected by screws 136. These thin, flexible, metallic strips 34 are narrower at their middle portions than at their ends, as clearly shown in Fig. 11.

As indicated in Figs. 12 and 13, the yielding electrical connection between the commutator and rotor coils is accomplished by a modified construction. The rotor coils are connected to terminals 30 that contact with blocks 35 of triangular form, here shown as a right-angled triangle. These blocks enter somewhat similar slots in the commutator bars 13, the slot having a curved wall; and between the curved wall and the hypotenuse of the triangular block 35 is a plate 37 having a flat face and an opposite curved face. Between the bottom of the triangular block and the bottom wall of the slot is a spring 36 to urge the block 35 upward, thus at all times maintaining contacts between 13, 37, 35 and 30, irrespective of the displacement of 30 with respect to 13. The centrifugal force generated by the rotation of the rotor will assist the action of spring 36.

In Fig. 14, which is a plan view, and Fig. 15 an end elevation thereof, the ends of the thin metal strips 38 are spaced by thin metal pieces and then inserted in grooves between the ends of the commutator bars and held therein by wedges 39 of insulating material.

Figs. 16 and 17 are a side elevation, end view and plan illustrating a method of securing the connecting member 33 to a dove-tail 40 projecting from the end of the commutator bars. The dotted line shows the form of the connector before being forced on the dove-tail 40.

Figs. 18 and 19 illustrate the dove-tail 40 within a groove 41 in the end of a commutator bar.

In Fig. 3 the standard 8 is independent of the machine frame so that the vibrations of the frame are not transmitted to the standard and to the commutator 5 supported thereby.

In Fig. 4 the commutator 5 is supported in the casing of a combined generator 4 and turbine 10 of the Curtis type, mounted on a shaft 9 common to both of them. A yielding bearing 11 permits a certain amount of deviation or eccentric movement of shaft 9.

I claim—

1. In a dynamo-electric machine, the combination with the rotating elements thereof: of a commutator, a mounting therefor independent of the rotating elements and yielding means to electrically connect the rotating elements and commutator, whereby the eccentric movements of the rotating elements will not be communicated to the commutator.

2. In a dynamo-electric machine, the combination with the rotor thereof; of a commutator, a mounting therefor independent of the rotor, means to drive the commutator from the rotor, and means to yieldingly electrically connect the rotor and commutator.

3. In a dynamo-electric machine, the combination with the rotor and its shaft; of a commutator, means to rotatively mount the commutator and independent of the rotor and its shaft, mechanical means to yieldingly connect the commutator to the rotor shaft and flexible electrical connections between the commutator and rotor.

4. In a dynamo-electric machine, the combination with the rotor and its shaft; of a yielding bearing for the rotor shaft, a commutator, a bearing therefor, yielding means to electrically connect the commutator and rotor, and means to rotate the commutator at the same angular speed as the rotor.

5. In a dynamo-electric machine, the combination with the rotor and its shaft; of a commutator mounted separate from the rotor and driven therefrom, and thin metal plates between the ends of the commutator segments and the respective rotor coil terminals.

6. In a dynamo electric machine, the combination with the rotating elements thereof, of a commutator, a mounting therefor independent of the rotating elements, means to mechanically and electrically connect the commutator with the rotating elements, said means causing the rotation of the commutator with said elements and permitting eccentric movement of the elements with respect to the commutator.

7. In a dynamo-electric machine, the combination with the rotor and its shaft; of a commutator mounted separate from the rotor, a slot and pin connection between the rotor shaft and commutator to drive the latter, thin metal plate or plates loosely riveted to each rotor coil terminal, a connecting member also loosely riveted to the plate or plates and means to electrically connect said member to the respective commutator segment.

8. In a dynamo electric machine having rotor coils and a shaft, the combination with a current collector, of a mounting therefor independent of the rotor coils and shaft, and yielding means to electrically and mechanically connect the coils and current collector, whereby the eccentric movements of the rotor will not be communicated to the current collector.

In testimony, that I claim the foregoing as my invention, I have signed my name in presence of two subscribing witnesses.

BIRGER LJUNGSTRÖM.

Witnesses:
HJALMAR ZETTERSTRÖM,
A. H. COOK.

---

Copies of this patent may be obtained for five cents each, by addressing the "Commissioner of Patents, Washington, D. C."